US012626051B1

(12) United States Patent
Shah et al.

(10) Patent No.: US 12,626,051 B1
(45) Date of Patent: May 12, 2026

(54) REAL-TIME SUMMARY EVALUATION LARGE LANGUAGE MODEL

(71) Applicant: Amazon Technologies, Inc., Seattle, WA (US)

(72) Inventors: Devansh Shah, Sunnyvale, CA (US); Michael Mark Goodwin, Scotts Valley, CA (US); Srikanth Venkata Tenneti, Hyderabad (IN); Mehmet Umut Isik, Mount Kisco, NY (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

(21) Appl. No.: 18/605,663

(22) Filed: Mar. 14, 2024

(51) Int. Cl.
G06F 40/166 (2020.01)
G06F 40/30 (2020.01)

(52) U.S. Cl.
CPC ............ G06F 40/166 (2020.01); G06F 40/30 (2020.01)

(58) Field of Classification Search
CPC .................................................... G06F 40/166
USPC ........................................................ 715/254
See application file for complete search history.

(56) References Cited

U.S. PATENT DOCUMENTS

| | | | | |
|---|---|---|---|---|
| 7,676,372 B1 * | 3/2010 | Oba | ...................... | G09B 21/009 |
| | | | | 704/271 |
| 11,095,468 B1 * | 8/2021 | Pandey | ................ | H04L 12/1831 |
| 11,425,253 B1 * | 8/2022 | Hansen | .................... | G10L 15/22 |
| 11,615,799 B2 * | 3/2023 | Zhu | ....................... | G06F 16/383 |
| | | | | 704/235 |

| | | | | |
|---|---|---|---|---|
| 11,929,074 B2 * | 3/2024 | Tay | ...................... | G06Q 10/103 |
| 12,038,958 B1 * | 7/2024 | Soubbotin | ............. | G06F 16/335 |
| 12,113,934 B1 * | 10/2024 | Dempsey | ............ | H04M 3/5175 |
| 12,216,692 B1 * | 2/2025 | Rogynskyy | .......... | G06N 3/0475 |
| 2020/0327432 A1 * | 10/2020 | Doebelin | ................. | G06N 5/02 |
| 2021/0294829 A1 * | 9/2021 | Bender | ................. | G10L 15/197 |
| 2022/0109585 A1 * | 4/2022 | Asthana | ................ | G06F 40/289 |
| 2023/0044564 A1 * | 2/2023 | Jezewski | ................. | G06F 40/30 |
| 2023/0135335 A1 * | 5/2023 | Makino | ............ | G06V 30/19093 |
| | | | | 704/9 |
| 2023/0281466 A1 * | 9/2023 | Bendale | .............. | G06F 16/9535 |

(Continued)

OTHER PUBLICATIONS

U.S. Appl. No. 18/605,660, Real-Time Summarization Large Language Model, filed Mar. 14, 2024.

*Primary Examiner* — Reza Nabi
(74) *Attorney, Agent, or Firm* — KNOBBE, MARTENS, OLSON & BEAR, LLP

(57) ABSTRACT

The present disclosure generally relates to systems and methods for generating and evaluating a transcript summary based on a transcript of an active meeting. A summary evaluation system may evaluate a summary based on both completeness and accuracy. The summary evaluation system may generate, via a machine learning model, questions and correct answers based on a first representation of the transcript (e.g., the transcript summary). The summary evaluation system may determine possible answers to the questions based on a second representation of the transcript (e.g., transcript). Depending on a comparison between the answers, a completeness score of the summary is generated. In some embodiments, the first representation of the transcript may be the transcript, the second representation of the transcript may be the generated transcript summary, and the score may be an accuracy score. Regeneration of the summary may be prompted if the score is below a threshold.

19 Claims, 9 Drawing Sheets

(56) References Cited

U.S. PATENT DOCUMENTS

| 2024/0020327 A1* | 1/2024 | Andrew ................ G06F 16/345 |
|---|---|---|
| 2024/0248918 A1* | 7/2024 | Bhagavan .............. G06F 40/30 |
| 2024/0273793 A1* | 8/2024 | DeCharms ........... G06F 40/197 |
| 2024/0290331 A1* | 8/2024 | Lu ......................... G10L 15/063 |
| 2024/0346238 A1* | 10/2024 | Ben-David .......... G06F 16/345 |
| 2024/0378379 A1* | 11/2024 | Jerger .................. G06F 40/106 |
| 2024/0395258 A1* | 11/2024 | Hiray ...................... G10L 15/04 |
| 2024/0420404 A1* | 12/2024 | Kasap ................... G06F 16/345 |
| 2025/0005063 A1* | 1/2025 | Kulshreshtha ........ G06F 40/169 |
| 2025/0005298 A1* | 1/2025 | Dingliwal .............. G06F 40/20 |
| 2025/0062928 A1* | 2/2025 | Choi ................... H04L 12/1831 |
| 2025/0094716 A1* | 3/2025 | Wang ................... G06F 40/216 |
| 2025/0210037 A1* | 6/2025 | Weisz .................. G10L 15/183 |
| 2025/0260790 A1* | 8/2025 | Giovanardi .......... G11B 27/031 |
| 2025/0284877 A1* | 9/2025 | Pandey ................ G06F 40/166 |
| 2025/0292165 A1* | 9/2025 | Arcilla .................. G06F 16/438 |
| 2025/0298986 A1* | 9/2025 | Giovanardi ........... G06F 16/345 |

* cited by examiner

*100*

110

*600*

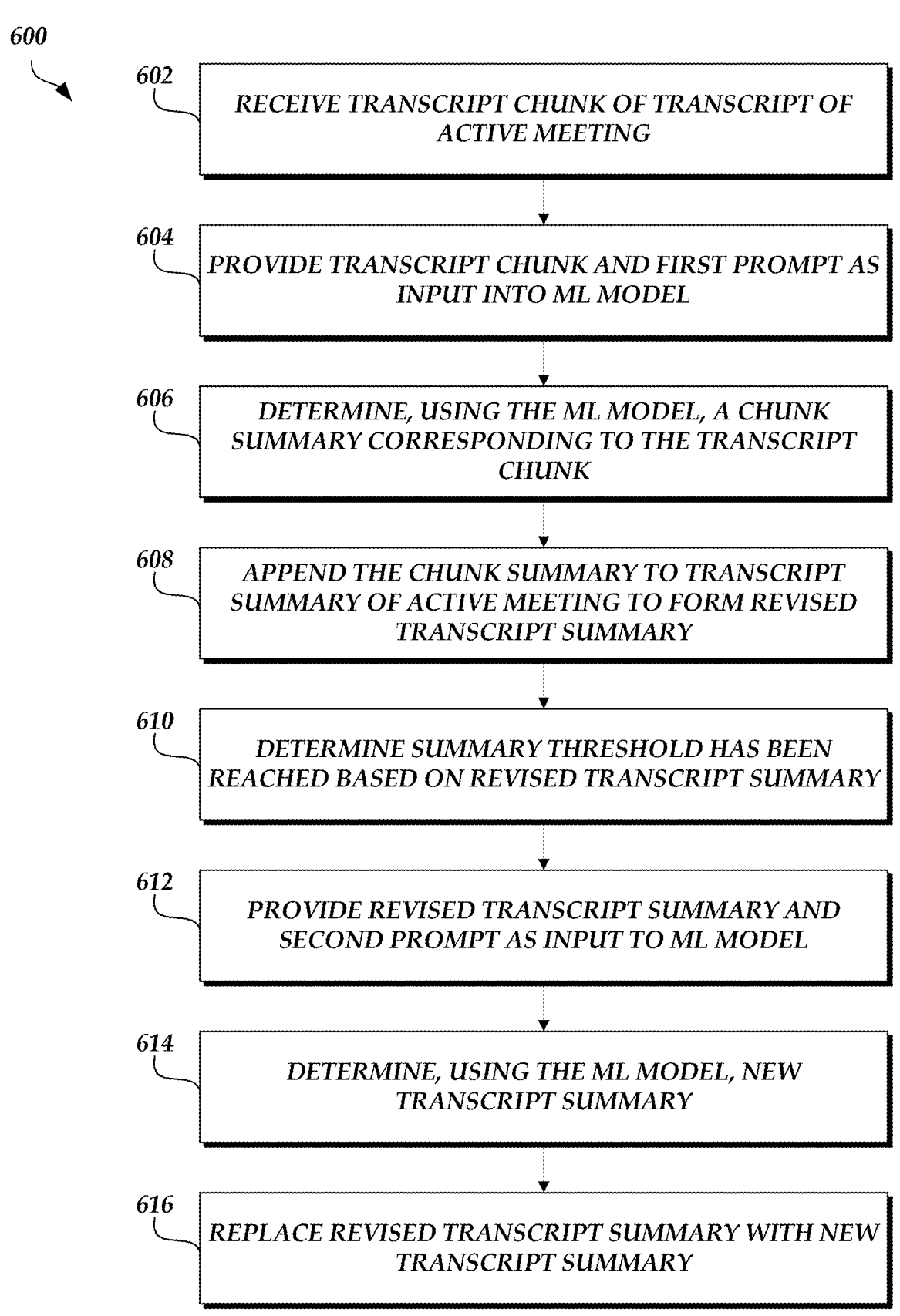

602 RECEIVE TRANSCRIPT CHUNK OF TRANSCRIPT OF ACTIVE MEETING

604 PROVIDE TRANSCRIPT CHUNK AND FIRST PROMPT AS INPUT INTO ML MODEL

606 DETERMINE, USING THE ML MODEL, A CHUNK SUMMARY CORRESPONDING TO THE TRANSCRIPT CHUNK

608 APPEND THE CHUNK SUMMARY TO TRANSCRIPT SUMMARY OF ACTIVE MEETING TO FORM REVISED TRANSCRIPT SUMMARY

610 DETERMINE SUMMARY THRESHOLD HAS BEEN REACHED BASED ON REVISED TRANSCRIPT SUMMARY

612 PROVIDE REVISED TRANSCRIPT SUMMARY AND SECOND PROMPT AS INPUT TO ML MODEL

614 DETERMINE, USING THE ML MODEL, NEW TRANSCRIPT SUMMARY

616 REPLACE REVISED TRANSCRIPT SUMMARY WITH NEW TRANSCRIPT SUMMARY

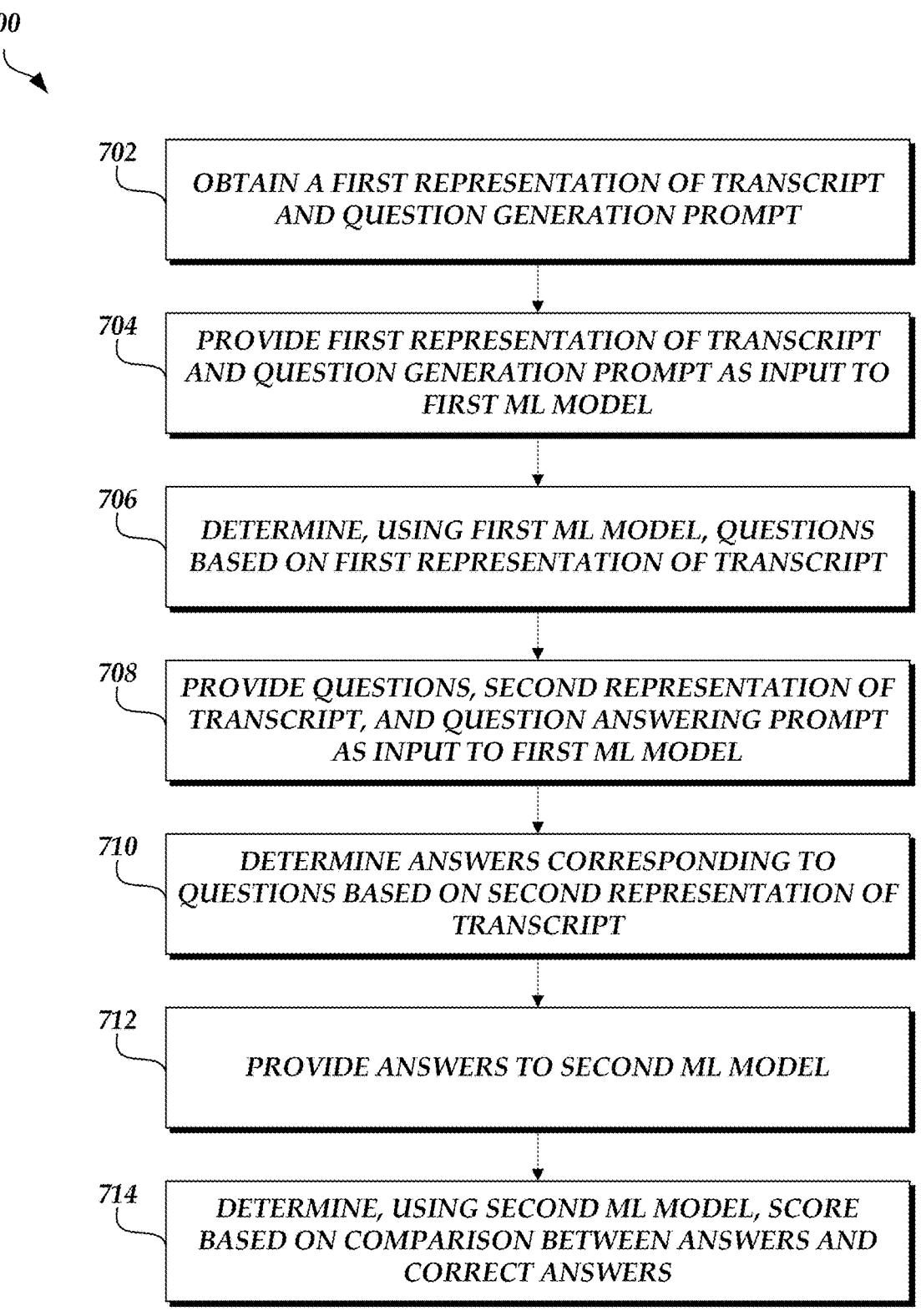

702 — OBTAIN A FIRST REPRESENTATION OF TRANSCRIPT AND QUESTION GENERATION PROMPT

704 — PROVIDE FIRST REPRESENTATION OF TRANSCRIPT AND QUESTION GENERATION PROMPT AS INPUT TO FIRST ML MODEL

706 — DETERMINE, USING FIRST ML MODEL, QUESTIONS BASED ON FIRST REPRESENTATION OF TRANSCRIPT

708 — PROVIDE QUESTIONS, SECOND REPRESENTATION OF TRANSCRIPT, AND QUESTION ANSWERING PROMPT AS INPUT TO FIRST ML MODEL

710 — DETERMINE ANSWERS CORRESPONDING TO QUESTIONS BASED ON SECOND REPRESENTATION OF TRANSCRIPT

712 — PROVIDE ANSWERS TO SECOND ML MODEL

714 — DETERMINE, USING SECOND ML MODEL, SCORE BASED ON COMPARISON BETWEEN ANSWERS AND CORRECT ANSWERS

FIG. 7

REAL-TIME SUMMARY EVALUATION LARGE LANGUAGE MODEL

BACKGROUND

Participants of a meeting typically speak during the meeting to present content or contribute to a discussion. Once a meeting ends, speech recognition techniques may be performed on the meeting audio (e.g., recording) to create a transcript. The transcript may be available for users to read and reference any speech that occurred during the meeting.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 6 is an example routine for generating a transcript summary based on a transcript of an active meeting.

FIG. 7 is an example routine for evaluating a generated transcript based on completeness and accuracy.

DETAILED DESCRIPTION

Figure 1:
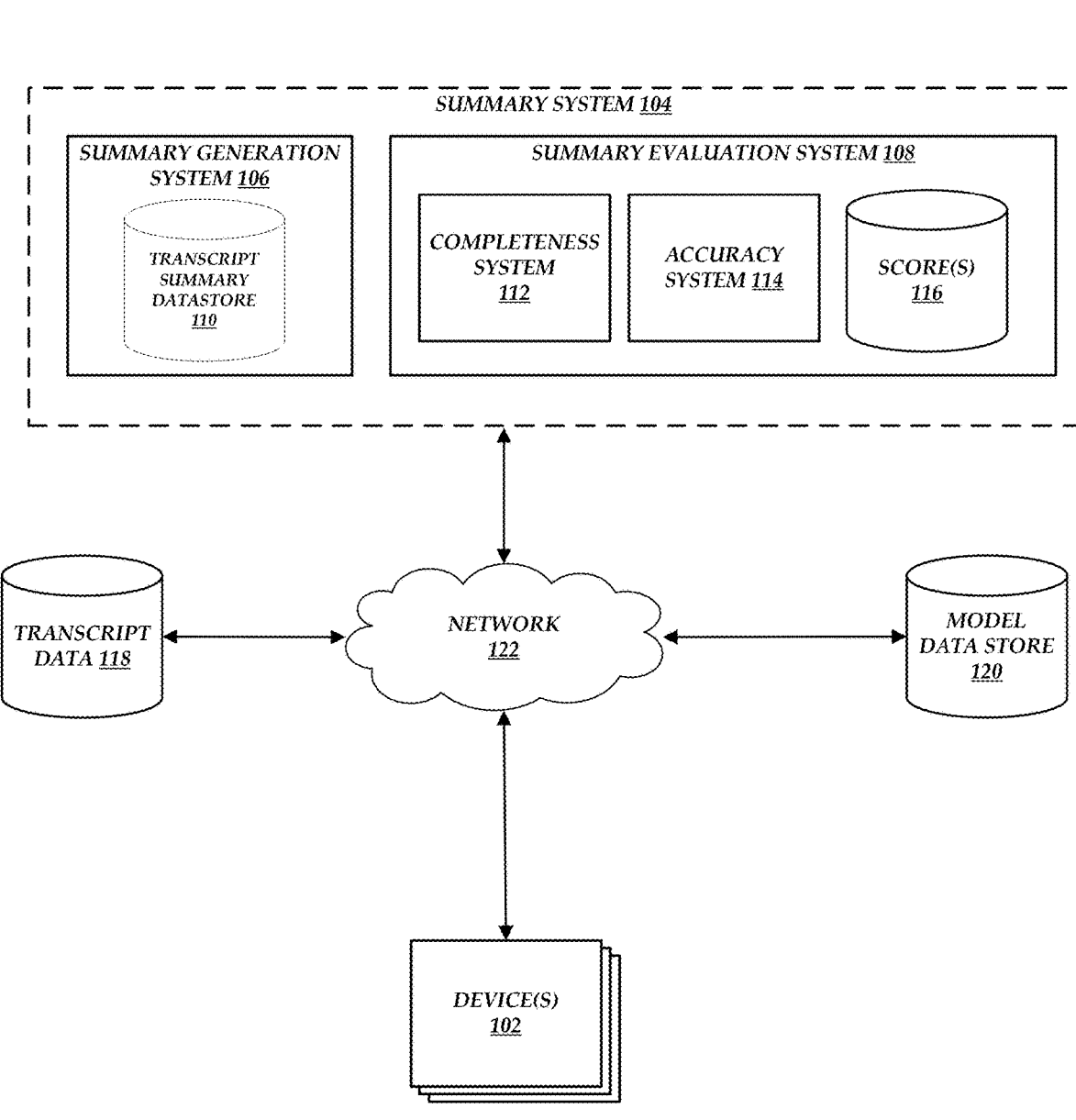
FIG. 1 is a block diagram depicting an illustrative environment in which a summary system provides generation and evaluation of transcript summaries.

Generally, aspects of the present disclosure relate to generating and evaluating a transcript summary of an active meeting. As used herein, an active meeting may refer to any meeting, such as a teleconference or online meeting, in which the meeting is online, in-progress, in-session, or otherwise has been started and not yet ended. An active meeting may also refer to a meeting during which at least one user has joined or logged onto the meeting and at least one user remains in the meeting, a meeting that has not been ended by the host, etc. As an active meeting progresses, a transcript of the dialogue between participants may be generated and stored. Although the transcript provides a raw script of the meeting content, it is often helpful to generate a summary based on the transcript to condense the meeting into important points. Text summarization plays an important role in the context of an active meeting to condense real-time conversations into a concise recap as the meeting progresses. The generation of a summary based on a transcript of an active meeting provides participants with highlights and important points of the ongoing meeting. In addition, the generation of a summary during an active meeting (as opposed to an end-of-call summarization) provides participants with meeting highlights as the meeting progresses. Transcript summaries from active meetings are typically generated using machine learning models, such as large language models ("LLMs"). In addition, the quality of a summary may be evaluated by certain metrics, such as completeness and accuracy.

Text summarization of transcripts of active meetings are typically generated incrementally, such as at predefined checkpoints. Checkpoints may be predefined based on a fixed number of words or tokens. In a baseline or fixed approach, a summarization of the entire available transcript may be generated at each checkpoint. This provides the LLM with the entire transcript of the meeting up until that point in time, and will replace the summary with newer versions at each checkpoint. Another example includes a rolling summary approach, in which a transcript chunk and an existing summary is fed into the LLM at each checkpoint to provide an updated summary. This approach allows continuity in the generated summaries.

Although both summarization techniques allow incremental generation of summaries (as opposed to post-call summarization), multiple calls to an LLM may cause several technical issues. Repeated calls to an LLM may become computationally expensive. For example, multiple calls may result in increased utilization of the processor and memory executing the summarization process. If calls are made to an LLM hosted in a cloud environment, repeated calls may also result in a reduction in the available network bandwidth. It is also noted that computational costs based on the prior approaches described above may be compounded due to the increasing size of data being fed to the LLMs. For example, because both approaches input the running summary each time a checkpoint is reached, the size of the data increases each time a new call to the LLM is made. This may negatively impact the amount of computing resources available for this task, resulting in delays in summary generation and other latency issues. This may also cause the time taken to generate a new summary to increase each time a new call is made given that the size of data may increase for each new call, resulting in transcript summaries taking progressively longer to generate and display to a user. In addition, the monetary cost of multiple calls to an LLM may become increasingly expensive as the length of the transcript continues to build. The total price of a transcript summary may be difficult to predict as the cost will be tied to the length of the active meeting. As such, an incremental summarization solution that reduces the negative effects of the technical issues described above is needed to address these issues.

Relatedly, the evaluation of generated summaries is important in assessing the quality of the generation process. A completeness metric may define the extent to which a summary captures information from the original transcript. An accuracy metric may evaluate the accuracy of information retained in a summary that was generated from the original transcript. Both of these metrics may provide a quality check on the generation process.

The summary system described herein may generate a transcript summary based on an active or ongoing meeting while minimizing latency and the number of calls to LLMs. To do so, a summary generation system of the summary system may receive a chunk, a portion, a part, etc. of an ongoing transcript ("transcript chunk"). The summary generation system may provide each transcript chunk as input into an LLM for summarization. In addition, the summary generation system may determine whether a running summary of the transcript has reached a threshold (e.g., size, word count, length), and if so, summarize the transcript summary by feeding it back into the LLM. This process allows the generated summary to stay within a certain length (e.g., a certain word count, a certain character count, a certain file size, etc.), for example, and may provide a concise and accurate representation of the original transcript.

In addition to generation, a summary evaluation system of the summary system may evaluate a generated summary based on both completeness and accuracy metrics. By utilizing a "question and answer" format, the summary system provides a "self-evaluation" of the generated summary. To do this, the summary evaluation system may utilize a first representation of the transcript, such as the transcript summary, to generate a set of questions. The summary evaluation system may then utilize a second representation of the transcript, such as the original transcript, to attempt to answer the generated set of questions. Through this process, the generated summary may be evaluated based on completeness and accuracy factors.

FIG. 1 depicts an example computing environment 100 in which embodiments of the present disclosure may be implemented by a summary system 104 to generate and evaluate a summary of a transcript. The summary system 104 may be used to generate a summary based on a transcript of a call (e.g., a phone call, a video call, etc.), a meeting (e.g., an audio meeting, an in-person meeting, a virtual meeting, etc.), a video conference, a chat log (e.g., messages transmitted between two or more users, between one or more users and a chat bot, etc.), a text chain (e.g., electronic messages like text messages transmitted between two or more users), etc. (hereinafter referred to as a "meeting" for ease of reference), while the meeting is active.

As shown in FIG. 1, the computing environment 100 may include user device(s) 102 (hereinafter referred to as "user device 102" for ease of reference), summary system 104 (including the summary generation system 106 and the summary evaluation system 108), transcript data 118, model(s) 120. The components of the computing environment 100 may be communicatively coupled via a network 122.

User device 102 illustratively corresponds to any computing device that provides functionality that allows for a user to interact with components of computing environment 100 including the summary system 104, the summary generation system 106, the summary evaluation system 108, the transcript data 118, and the model(s) 120. User device 102 may include user interfaces or dashboards that connect a user with a machine, system, or device. In various implementations, user device 102 includes computer devices with a display and a mechanism for user input (e.g., mouse, keyboard, voice recognition, touch screen, and/or the like). For example, the user device 102 includes a desktop, tablet, e-reader, server, wearable device, laptop or tablet computer, smartphones, gaming consoles, personal digital assistants (PDAs), hybrid PDA/mobile phone, mobile phone, electronic book reader, set-top box, voice command device, camera, digital media player, and the like. The user device 102 can access a cloud provider network via the network 122 to view or manage their data and computing resources, as well as to use websites and/or applications hosted by the cloud provider network. Elements of the cloud provider network may also act as clients to other elements of that network. Thus, user device 102 can generally refer to any device accessing a network-accessible service as a client of that service. In some embodiments, the user device 102 is a device associated with a user or participant of a call, a meeting, a video conference, teleconference, and the like. As such, the user device 102 may be configured to host, join, or otherwise participate in a meeting.

The network 122 can include any appropriate network, including wired network, wireless network, or combination thereof. For example, network 122 may be a personal area network, local area network, wide area network, cable network, satellite network, cellular network, or any other such network or combination thereof. As a further example, the network 122 may be a publicly accessible network of linked networks, possibly operated by various distinct parties, such as the Internet. Protocols and components for communicating via the Internet or any other types of communication networks are known to those skilled in the art of computer communications and thus, need not be described in more detail herein. In various embodiments, the network 122 may be a private or semi-private network, such as a corporate or university intranet. The network 122 may include one or more wireless networks, such as a Global System for Mobile Communications (GSM) network, a Code Division Multiple Access (CDMA) network, a Long-Term Evolution (LTE) network, C-band, mmWave, sub-6 GHz, or any other type of wireless network. The network 122 can use protocols and components for communicating via the Internet or any of the other aforementioned types of networks. For example, the protocols used by the network 122 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art of computer communications and thus, need not be described in more detail herein.

In various implementations, the network 122 can represent a network that may be local to a particular organization, e.g., a private or semi-private network, such as a corporate or university intranet. In some implementations, devices communicate via the network 122 without traversing an external network, such as the Internet. Devices connected via the network 122 in this case may be walled off from accessing the Internet. As an example, the network 122 may not be connected to the Internet. Accordingly, e.g., the user device 102 may communicate with the summary system 104 directly (via wired or wireless communications) or via the network 122, without using the Internet. Thus, even if the network 122 or the Internet is down, the summary system 104 may continue to communicate and function via direct communications (and/or via the network 122).

Transcript data 118 may include any information related to a meeting, call, teleconference, etc. For example, the transcript data 118 may include a text data transcription of a dialogue transcript between participants in a meeting, a speech, a video, a conversation, a presentation, and the like. The transcript data 118 may be generated by a program, application, or service within the summary generation system 106, the summary system 104, or computing environment 100 and accessible via the network 122. For example, the transcript data 118 may be generated by an artificial intelligence ("AI") or machine learning ("ML") based program that is integrated within a teleconference application.

In some embodiments, the transcript data 118 may be updated or appended as the active meeting progresses. For example, the transcript data 118 of an active meeting may be updated with a transcription of a user's speech as the user speaks. The transcript data 118 may also include all or a portion of a meeting transcript.

The summary system 104 may generate and evaluate summaries based on a transcript of an active meeting. As shown in FIG. 1, the summary system 104 includes the summary generation system 106 and the summary evaluation system 108.

Summary generation system 106 may generate a summary based on the transcript data 118 of an active meeting. To generate a summary, the summary generation system 106 may access the transcript data 118 over the network 122. In some embodiments, the summary generation system 106 may receive a chunk, portion, piece, segment, etc. of the transcript data 118. The chunk of transcript data 118 may be summarized by the summary generation system 106. In some examples, the summary generation system 106 may access a model, such as model stored in model data store 120 over the network 122, to summarize the transcript data 118.

To generate a summary based on the transcript data 118 of an active meeting, the summary generation system 106 may receive or access a transcript chunk from the transcript data 118. The summary generation system 106 may input the transcript chunk into a model, such as a model stored in model data store 120. The model data store 120 may include any machine learning model, artificial intelligence model, neural network, algorithm, etc. Using the model, the summary generation system 106 may generate a summary of the transcript data 118 (or the transcript chunk) and store it in a transcript summary datastore 110.

In some cases, incremental generation of a summary of an active meeting may result in a lengthy summary. It may be desirable to keep a total summary of the active meeting under a particular length etc. This may be helpful in reducing computing costs (e.g., to avoid sending large amounts of data to the LLM) and saving computing resources. In addition, the speed at which the transcript summary is generated may be preserved and consistent over time. As such, the summary generation system 106 may generate a summary of the existing summary stored in the transcript summary datastore 110. For example, the summary generation system 106 may determine that a length of the existing summary exceeds a threshold and may input the summary into the model to be summarized.

Figure 2:
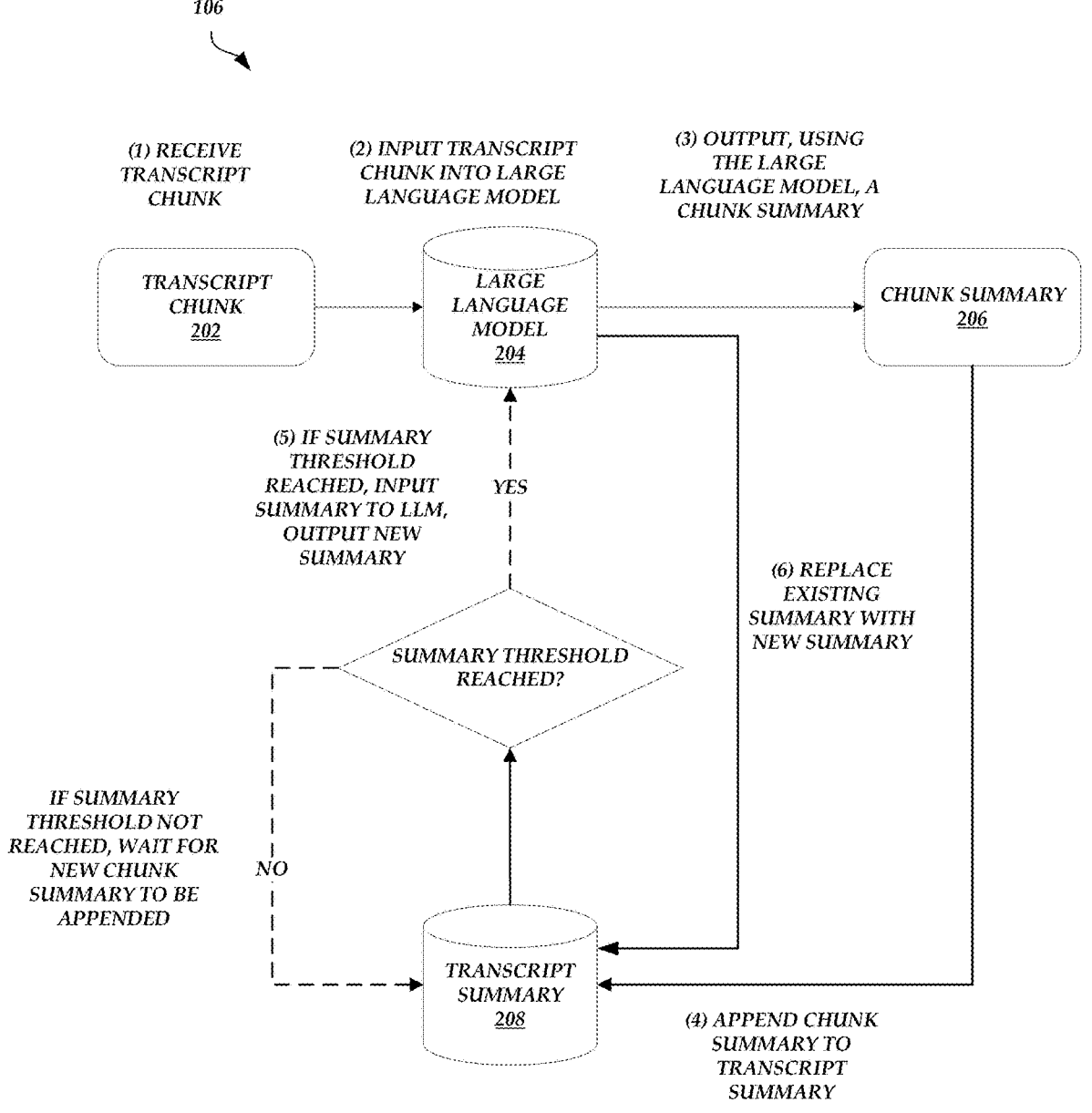
FIG. 2 is a block diagram depicting a summary generation system to provide a summary of a transcript of an active meeting.

As shown in FIG. 1, the summary system 104 includes a summary evaluation system 108. In some embodiments, the summary evaluation system 108 may evaluate a summary generated by the summary generation system 106. The summary evaluation system 108 may evaluate a summary based on two metrics: completeness and accuracy. As shown in FIG. 2, the summary evaluation system 108 includes a completeness system 112, an accuracy system 114, and a score(s) 116. The completeness system 112 may determine a completeness score of the summary and store the score, which may be represented by score(s) 116. Similarly, the accuracy system 114 may determine an accuracy score of the summary and store the score, which may be represented by score(s) 116.

To evaluate a summary based on completeness or accuracy, the summary evaluation system 108 may generate a set of questions using a first representation of a transcript, such as either the transcript (e.g., raw transcript) or a summary of the transcript. The summary evaluation system 108 may also, using a second representation of the transcript (the summary or the transcript itself), answer the set of questions. The score(s) 116 may include a percentage, value, etc. that represents the amount of correctly answered questions.

FIG. 2 is a block diagram depicting a summary generation system 106 to provide a summary of a transcript of an active meeting.

At (1), the summary generation system 106 may receive a transcript chunk 202. The transcript chunk 202 may correspond to a portion of the transcript data 118 of an active or ongoing meeting. For example, the transcript chunk 202 may represent a portion of the transcript data 118 generated between a first timestamp to a second timestamp. Alternatively, or in addition, the transcript chunk 202 may represent a portion of the transcript data 118 within a word count, sentence count, character count, etc. In the context of an active meeting, the transcript chunk 202 received by the summary generation system 106 may include a portion of the transcript data 118 generated up until a certain timestamp (e.g., every five minutes, a new transcript chunk 202 is partitioned from an ongoing transcript and received by the summary generation system 106).

It is noted that the flow outlined by the block diagram in FIG. 2 may be iterative. For example, subsequent transcript chunks 202 may be received by the summary generation system 106 as an active meeting progresses. Subsequent transcript chunk 202 may represent a new portion of the transcript data 118 that has not already been partitioned into a transcript chunk 202. For example, a first transcript chunk 202 may correspond to the first 500 words of the transcript data 118 while a second transcript chunk may correspond to the next 500 words of the transcript data 118. In some embodiments, there may be overlaps of the transcript data 118 between a first transcript chunk and a subsequent transcript chunk.

At (2), the summary generation system 106 may input the transcript chunk 202 into a model, such as a large language model ("LLM") 204.

The LLM 204 may include any computer-based models of any type and of any level of complexity, such as any type of sequential, functional, or concurrent model. The LLM 204 can further include various types of computational models, such as, for example, artificial intelligence models, machine learning models, deep learning models, neural networks, transformer-based models, language models, etc. that can generate a textual summary based on the transcript chunk 202. The LLM may be trained on various sets of data. In addition, the LLM 204 may be stored in a remote location, such as in model data store 120, and accessible via network 122 by the summary generation system 106.

In addition to inputting the transcript chunk 202, the summary generation system 106 may make a call to the LLM 204 with a token or a prompt. The prompt may instruct the LLM 204 to generate a summary based on the transcript chunk 202. In some examples, the prompt may provide specific instructions or details to the LLM 204 with respect to the transcript chunk 202. For example, the prompt may instruct the LLM 204 to generate a summary within a certain length (e.g., word count, sentence count, character count, etc.), a certain style, a topic, or any other instruction.

As a result of the input transcript chunk 202 and the prompt, at (3), the LLM 204 may output a chunk summary 206. The chunk summary 206 may correspond to a summary based solely on the transcript chunk 202.

At (4), the summary generation system 106 may append the chunk summary 206 to a transcript summary 208. In the case where the chunk summary 206 represents the beginning of a transcript, the chunk summary 206 may become the transcript summary 208. As noted herein, the flow outlined by the block diagram in FIG. 2 is iterative. Accordingly, at (4), additional chunk summaries 206 may be appended to the transcript summary 208.

At (5), the summary generation system 106 may determine whether a summary threshold has been reached. The summary threshold may correspond to any quantitative aspect of the transcript summary 208, such as a word count, sentence count, character count, etc. For example, the summary generation system 106 may determine that the transcript summary 208 has reached a word count limit of 500 words.

Additionally, at (5), if the summary generation system 106 determines that the summary threshold has been reached, the summary generation system 106 may input the transcript summary 208 into the LLM 204. In addition to inputting the transcript summary 208 into the LLM 204, the summary generation system 106 may make a call to the LLM 204 with a token or a prompt. The prompt may instruct the LLM 204 to generate a new transcript summary based on the transcript summary 208. In some examples, the prompt may provide specific instructions or details to the LLM 204 with respect to the transcript summary 208. For example, the prompt may instruct the LLM 204 to generate a new transcript summary within a certain length (e.g., word count, sentence count, character count), a certain style, a topic, or any other instruction. Accordingly, the LLM may output a new transcript summary.

At (6), the summary generation system 106 may replace the existing transcript summary 208 with a new transcript summary generated by the LLM 204. In some cases, this process allows the transcript summary 208 to stay within a certain word limit as new transcript chunks 202 are received from an active meeting. This process outlined in FIG. 2 may continue until the end of an active meeting and/or all the transcript data 118 has been summarized.

Figure 3A:
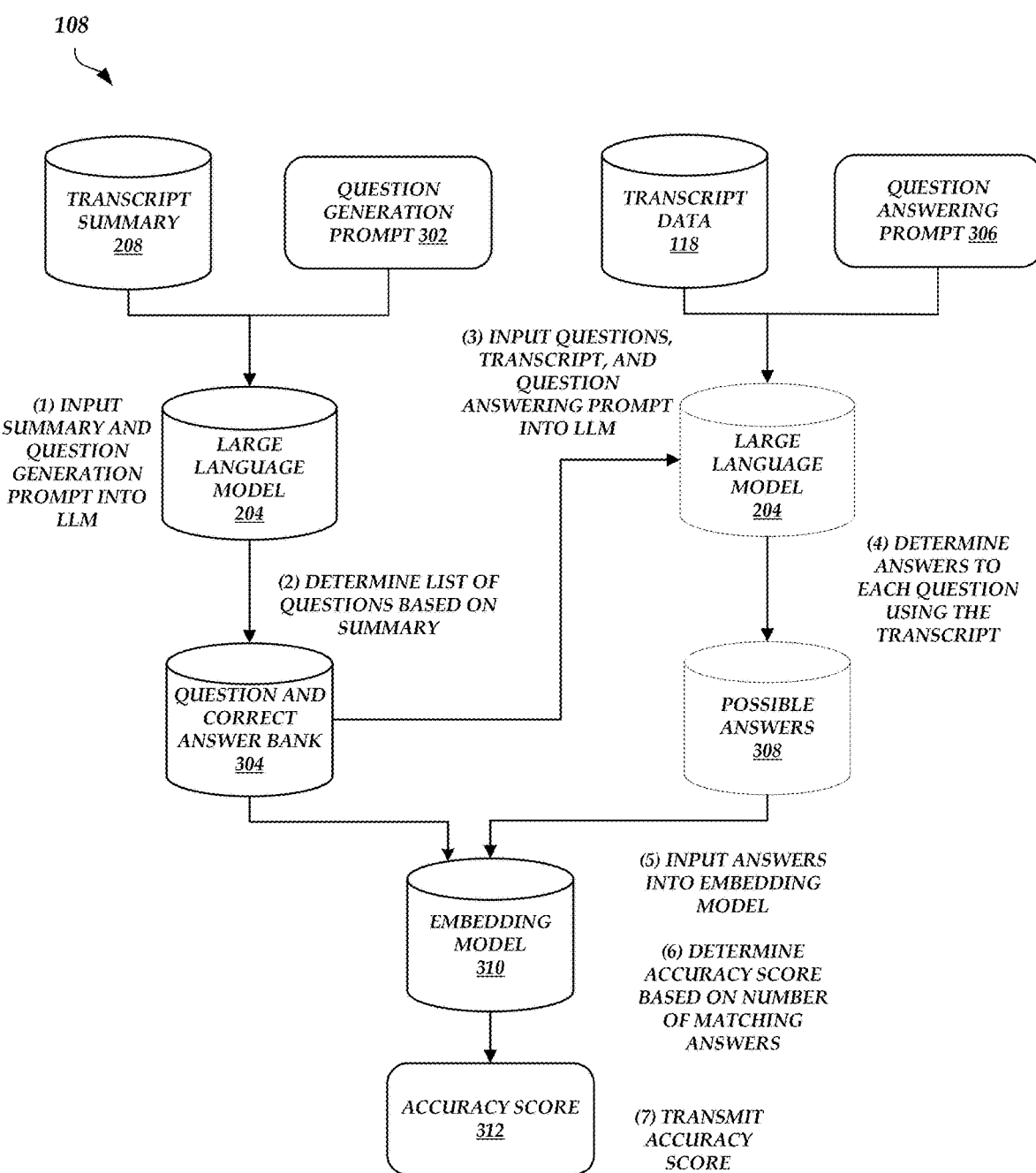
FIG. 3A is a block diagram depicting a summary evaluation system to provide an accuracy score of a summary generated by the summary generation system as described in FIG. 2.

FIG. 3A is a block diagram depicting a summary evaluation system 108 to provide an accuracy score 312 of a transcript summary 208 generated by the summary generation system 106 as described in FIG. 2. Accuracy may indicate the extent to which the transcript conveys correct information from the original transcript (or transcript data 118).

At (1), the summary evaluation system 108 may input the transcript summary 208 and a question generation prompt 302 into an LLM 204. As noted herein, the transcript summary 208 may be generated by the summary generation system 106 and may correspond to the transcript data 118 of a meeting, call, etc. that was previously active during generation. The question generation prompt 302 may instruct the LLM 204 to generate a set of questions and answers based on the transcript summary 208. The question generation prompt 302 may instruct the LLM 204 to determine a certain number of questions, or instruct to determine question(s) tailored to a specific topic, etc.

In response to the input, at (2), the summary evaluation system 108 may determine, using the output of the LLM 204, a set of questions and corresponding "correct" answers. The set of questions generated by the LLM 204 may be based on the transcript summary 208. The questions generated by the LLM 204 may include any type of question that utilizes information in the transcript summary 208. The questions may include open-ended questions, close-ended questions, topical questions, specific questions, and the like. For example, the input transcript summary 208 may comprise the following: "Nolan called First Airlines to address a canceled LA flight. Agent Casey rebooked 5 PM flight, but no window seats available. Nolan requested window seat. Agent submitted request, but no window seats available. Transferred to Supervisor Michael who apologized and offered complimentary premium upgrade. Nolan accepted upgrade." In this example, the summary evaluation system 108 may input this transcript summary and a prompt into the LLM 204. In response, the LLM 204 may output the following example question and answer pairs: ("question": "what type of seat did Nolan request?"; "correct answer": "window seat"); ("question": "who was the supervisor?"; "correct answer": "Michael"); ("question": "what did Nolan accept?"; "correct answer": "upgrade"). It is noted that the answers generated may be considered the "correct" answer as related to the transcript summary 208. Additionally, at (2), the set of questions and answers derived from the transcript summary 208 may be stored in a question and correct answer bank 304.

In order to evaluate the accuracy of the transcript summary 208, the summary evaluation system 108 will attempt to answer the generated questions with the transcript data 118. As such, at (3), the summary evaluation system 108 may input the set of questions (without the corresponding correct answers), the transcript data 118, and a question answering prompt 306 into the LLM 204. The question answering prompt 306 may instruct the LLM 204 to generate a set of answers ("possible answers") corresponding to each question based on the transcript data 118.

In response to the input, at (4), the summary evaluation system 108 may determine, using the output of the LLM 204, a set of possible answers corresponding to the set of questions based on the transcript data 118. The possible answers may be determined based on information found in the transcript data 118. For example, in response to the three questions in the example provided above, the LLM 204 may determine the following possible answers, based on the transcript data 118: "1) window seat; 2) Michael; 3) complimentary upgrade." The possible answers to each question may be stored in database labeled as possible answers 308. It is noted that at this point, the summary evaluation system 108 may have access to a set of questions created from the transcript summary 208, a set of corresponding correct answers, and a set of possible answers based on the transcript data 118.

At (5), the summary evaluation system 108 may input the set of corresponding correct answers, and the set of possible answers into an embedding model 310. The embedding model 310 may include any algorithm or AI model, ML model, neural network, etc. trained to encapsulate information into representations in a multi-dimensional space. Here, the embedding model 310 may determine a semantic similarity between the correct answers and the possible answers, such as by using a cosine similarity or other function. The embedding model 310, may at (5), determine whether a correct answer and a possible answer is a match, based on the semantic similarity. In the example provided above, it is noted that both the correct and possible answers for the first two questions are matches: 1) window seat, 2) Michael. However, the possible answer for the third question ("What did Nolan accept?") is "complimentary upgrade," whereas the correct answer is "upgrade." In this case, the embedding model 310 may compare a semantic similarity between the two answers and likely determine that the answers are a match.

At (6), the summary evaluation system 108 may determine an accuracy score 312 based on the number of matching answers between the correct answers and the possible answers. The accuracy score 312 may include a percentage, a decimal, a fraction, or any other indicator based on the number of matching answers. In some examples, the accuracy score 312 may represent an average number of matching answers. In addition, at (7), the accuracy score 312 may be transmitted, such as to the device 102 or to another system for further processing. In some embodiments, the accuracy score 312 may be used to tune or train the LLM 204.

In some embodiments, the summary evaluation system 108 may determine whether the score is above or below a score threshold. The score threshold may include a number, value, percentage, and the like. In the case when the score is below the score threshold, the summary evaluation system 108 may prompt the summary generation system 106 to generate a new summary utilizing the correct answers.

Figure 3B:
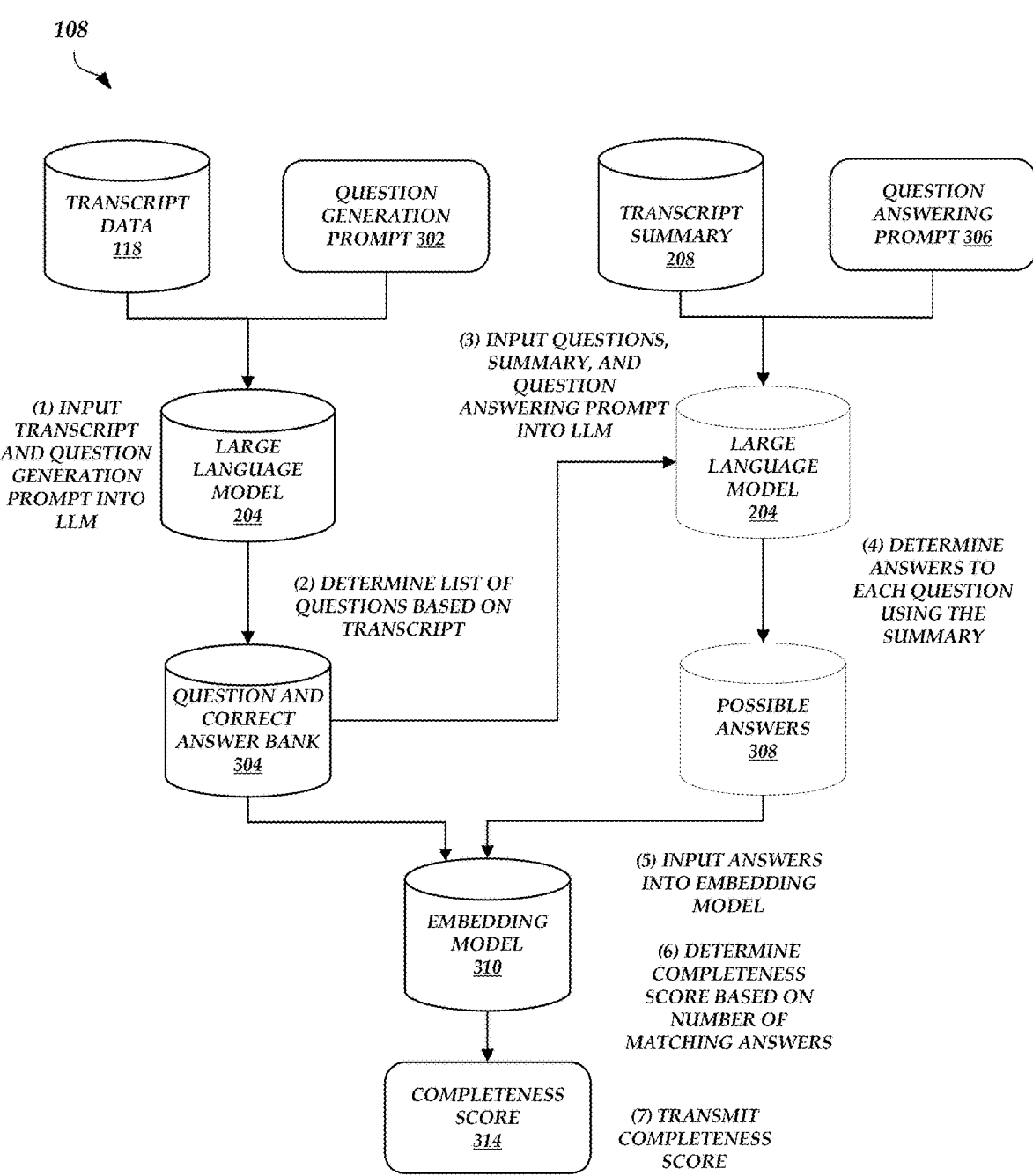
FIG. 3B is a block diagram depicting a summary evaluation system to provide a completeness score of a summary generated by the summary generation system as described in FIG. 2.

FIG. 3B is a block diagram depicting a summary evaluation system 108 to provide a completeness score 314 of a transcript summary 208 generated by the summary generation system 106 as described in FIG. 2. Completeness may indicate the extent to which the transcript summary 208 captures information from the original transcript (or transcript data 118).

At (1), the summary evaluation system 108 may input the transcript data 118 and a question generation prompt 302 into an LLM 204. As noted herein, the transcript data 118 may be used to generate a transcript summary 208 by processes described in FIG. 2 and elsewhere. The transcript data 118 may correspond to a meeting, call, etc. that was previously active during generation of the transcript summary 208. The question generation prompt 302 may instruct the LLM 204 to generate a set of questions and answers based on the transcript data 118. The question generation prompt 302 may instruct the LLM 204 to determine a certain number of questions based on the transcript data 118, or instruct to determine question(s) tailored to a specific topic, etc.

In response to the input, at (2), the summary evaluation system 108 may determine, using the output of the LLM 204, a set of questions and corresponding "correct" answers. Additionally, at (2), the set of questions and correct answers may be stored in a question and correct answer bank 304. The set of questions generated by the LLM 204 may be based on the transcript summary 208. The questions generated by the LLM 204 may include any type of question that utilizes information in the transcript data 118. The questions may include open-ended questions, close-ended questions, topical questions, specific questions, and the like. For example, the input transcript data 118 may comprise the following:

Nolan: Hello, I received a notification that my upcoming flight to LA was cancelled. I'd like to rebook.

Agent Casey: No problem, sir. Sorry to hear the flight was cancelled. I'm looking at upcoming flights right now and it looks like the next one is a 4:00 PM flight between the same airports.

Nolan: That sounds good, would it be possible to book a window seat?

Agent Casey: Let me put in a request . . . Sorry, I don't see any available.

Nolan: Hm . . . can I speak to your supervisor?

Agent Casey: Yes, let me transfer you.

Supervisor Michael: Hello, this is Michael. How can I help you?

Nolan: Hi Michael, I'm trying to rebook a flight that was cancelled. I believe I was talking to Casey who said there aren't any window seats available on the 4:00 PM flight from JFK to LAX.

Supervisor Michael: I apologize about that, sir. Unfortunately we're almost completely booked on that flight. But I can offer you a complimentary premium upgrade instead. Would that be alright?

Nolan: Sure, that's fine. I appreciate it.

In this example, the summary evaluation system 108 may input this transcript data 118 and the prompt into the LLM 204. In response, the LLM 204 may output the following example question and answer pairs: ("question": "what was the customer's original destination?", "correct answer": "LAX"); ("question": "what was the initial problem with the customer's flight reservation?"; "correct answer": "canceled flight"); ("question": "what time is the rebooked flight?" "correct answer": "4:00 PM").

In order to evaluate the completeness of the transcript summary 208, the summary evaluation system 108 will attempt to answer the generated questions with the transcript summary 208. As such, at (3), the summary evaluation system 108 may input the set of questions (without the corresponding correct answers), the transcript summary 208, and a question answering prompt 306 into the LLM 204. The question answering prompt 306 may instruct the LLM 204 to generate a set of answers ("possible answers") corresponding to each question based on the transcript summary 208.

In response to the input, at (4), the summary evaluation system 108 may determine, using the output of the LLM 204, a set of possible answers corresponding to the set of questions based on the transcript summary 208. The possible answers may be determined based on information found in the transcript summary 208. For example, in response to the three questions in the example provided above, the LLM 204 may determine the following possible answers, based on the transcript summary 208: "1) LA; 2) canceled flight; 3) 5:00 PM." The possible answers to each question may be stored in database labeled as possible answers 308. It is noted that at this point, the summary evaluation system 108 may have access to a set of questions created from the transcript data 118, a set of corresponding correct answers, and a set of possible answers based on the transcript summary 208.

At (5), the summary evaluation system 108 may input the set of corresponding correct answer, and the set of possible answers into an embedding model 310. As noted herein, the embedding model 310 may include any algorithm or AI model, ML model, neural network, etc. trained to encapsulate information into representations in a multi-dimensional space. Here, the embedding model 310 may determine a semantic similarity between the correct answers and the possible answers, such as by using a cosine similarity or other function. The embedding model 310, may at (5), determine whether a correct answer and a possible answer is a match, based on the semantic similarity. In the example provided above (and provided in the description of FIG. 3), it is noted that the both the correct and possible answers for the first two questions are matches: 1) Los Angeles/LAX, 2) canceled flight. However, the possible answer for the third question ("what time is the rebooked flight?") is "5:00 PM," (see example transcript summary provided in description of FIG. 3), whereas the correct answer according to the transcript data 118 is "4:00 PM." This indicates that the generated transcript summary 208 in this example contained an inaccuracy. Accordingly, the answers do not match in this example.

At (6), the summary evaluation system 108 may determine a completeness score 314 based on the number of matching answers between the correct answer and the possible answers. The completeness score 314 may include a percentage, a decimal, a fraction, or any other indicator based on the number of matching answers. In some examples, the completeness score 314 may represent an average number of matching answers. In addition, at (7), the completeness score 314 may be transmitted, such as to the device 102 or to another system for further processing. In some embodiments, the completeness score 314 may be used to tune or train the LLM 204.

In some embodiments, the summary evaluation system 108 may determine whether the score is above or below a score threshold. The score threshold may include a number, value, percentage, and the like. In the case when the score is below the score threshold, the summary evaluation system 108 may prompt the summary generation system 106 to generate a new summary utilizing the correct answers.

Figure 4A:
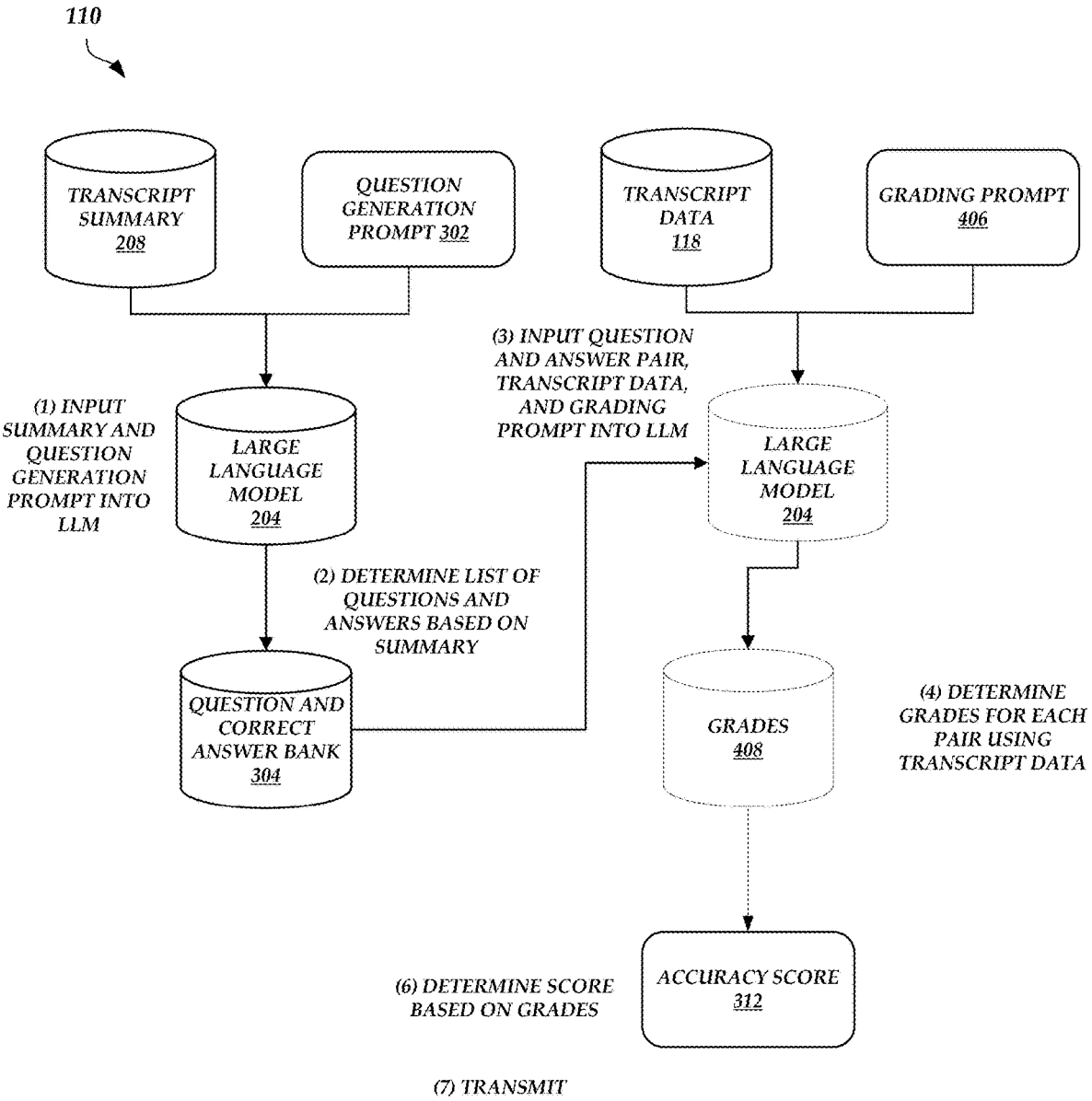
FIG. 4A is a block diagram depicting an additional embodiment of summary evaluation system to provide an accuracy score of a summary generated by the summary generation system as described in FIG. 2.

FIG. 4A is a block diagram depicting an additional embodiment of summary evaluation system 108 to provide an accuracy score 312 of a transcript summary 208 generated by the summary generation system 106 as described in FIG. 2.

At (1), the summary evaluation system 108 may input a first representation of the transcript and a question generation prompt 302 into an LLM 204. In some embodiments, the first representation of the transcript comprises a transcript summary 208. The question generation prompt 302 may instruct the LLM 204 to generate a set of questions and answers based on the transcript summary 208. The question generation prompt 302 may instruct the LLM 204 to determine a certain number of questions, or instruct to determine question(s) tailored to a specific topic, etc.

In response to the input, at (2), the summary evaluation system 108 may determine, using the output of the LLM 204, a set of questions and corresponding "correct" answers. The set of questions generated by the LLM 204 may be based on the transcript summary 208. The questions generated by the LLM 204 may include any type of question that utilizes information in the first representation 402. The questions may include open-ended questions, close-ended questions, topical questions, specific questions, and the like. It is noted that the answers generated may be considered the "correct" answer as related to the transcript summary 208. Additionally, at (2), the set of questions and answers derived from the transcript summary 208 may be stored in a question and correct answer bank 304.

In order to grade the set of questions and correct answers, the LLM 204 may act as a "grader" to evaluate whether a second representation of the transcript ("second representation") 404 can answer each question. At (3), the summary evaluation system 108 may input the set of questions and correct answers (e.g., each question and answer pair), the transcript data 118, and a grading prompt 406 into the LLM 204. The grading prompt 406 may instruct the LLM 204 to predict whether each question and answer pair can be inferred from the transcript data 118

In response to the input, at (4), the summary evaluation system 108 may determine, using the output of the LLM 204, a grade 408 for each question and answer pair. The grade for each pair may comprise a determination whether the answer can be inferred from the transcript data 118 (e.g., yes, no, undetermined). In addition, the grade may include an explanation, comment, or citation corresponding to the grade. For example, a "yes" response may comprise a citation from the transcript data 118 that contains the correct answer. A "no" response may include the correct answer that was unable to be located within the transcript data 118. Comments such as "no mention of the question/answer in the transcript" or "the summary contains hallucinated information, i.e., information not present in the transcript" may be included in the grade.

At (5), the summary evaluation system 108 may determine an accuracy score 312 based on the grades 408. The score may be based on an average number of "yes" responses, a total number of "yes" responses, or any other metric. In addition, at (7), the score may be transmitted, such as to the device 102 or to another system for further processing.

Figure 4B:
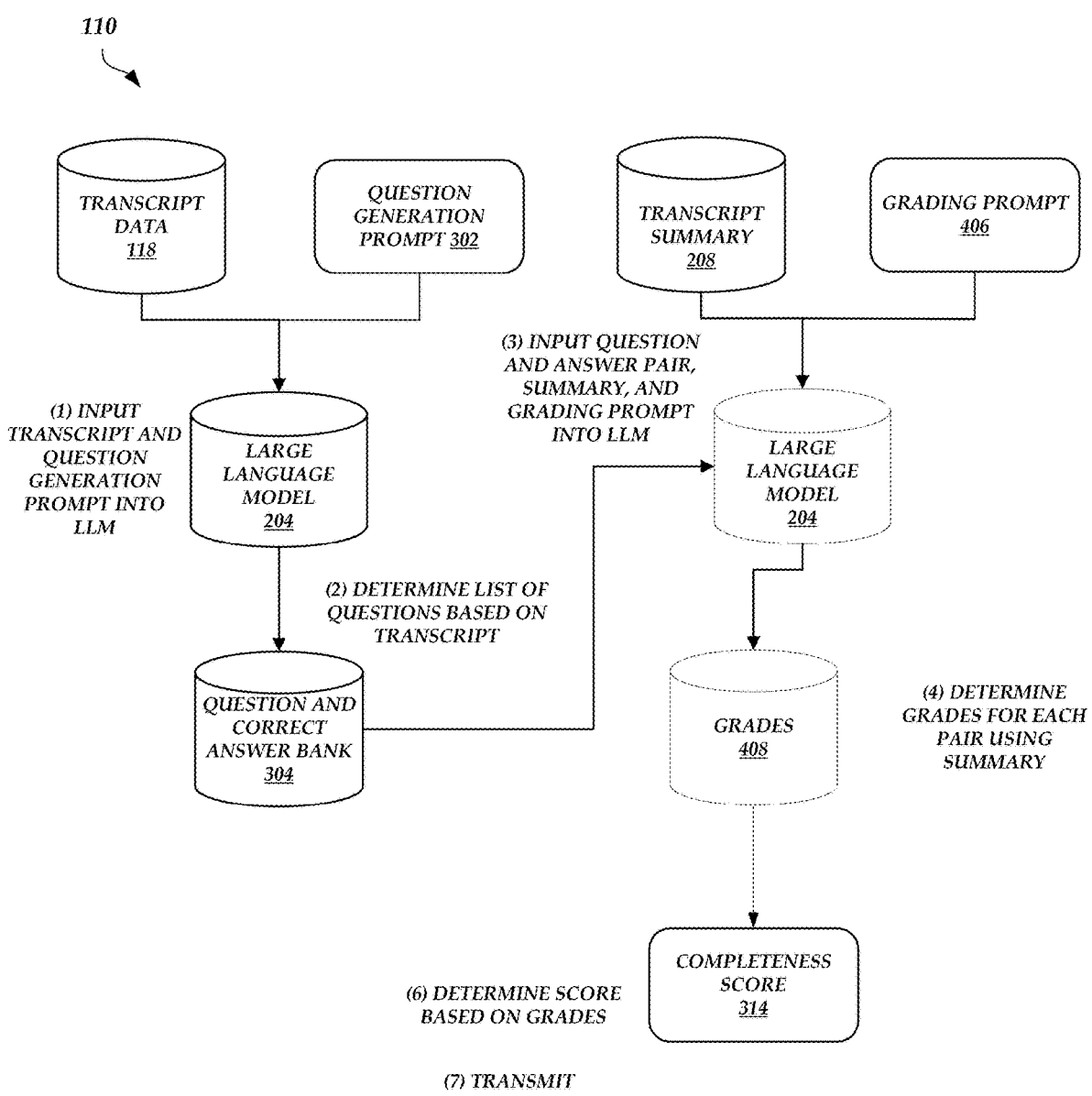
FIG. 4B is a block diagram depicting an additional embodiment of summary evaluation system to provide a completeness score of a summary generated by the summary generation system as described in FIG. 2.

FIG. 4B is a block diagram depicting an additional embodiment of summary evaluation system 108 to provide a completeness score 314 of a transcript summary 208 generated by the summary generation system 106 as described in FIG. 2.

At (1), the summary evaluation system 108 may input a first representation of the transcript and a question generation prompt 302 into an LLM 204. In some embodiments, the first representation of the transcript comprises transcript data 118. The question generation prompt 302 may instruct the LLM 204 to generate a set of questions and answers based on the transcript data 118. The question generation prompt 302 may instruct the LLM 204 to determine a certain number of questions, or instruct to determine question(s) tailored to a specific topic, etc.

In response to the input, at (2), the summary evaluation system 108 may determine, using the output of the LLM 204, a set of questions and corresponding "correct" answers. The set of questions generated by the LLM 204 may be based on the transcript data 118. The questions generated by the LLM 204 may include any type of question that utilizes information in the first representation 402. The questions may include open-ended questions, close-ended questions, topical questions, specific questions, and the like. It is noted that the answers generated may be considered the "correct" answer as related to the transcript data 118. Additionally, at (2), the set of questions and answers derived from the transcript data 118 may be stored in a question and correct answer bank 304.

In order to grade the set of questions and correct answers, the LLM 204 may act as a "grader" to evaluate whether a second representation of the transcript ("second representation") 404 can answer each question. At (3), the summary evaluation system 108 may input the set of questions and correct answers (e.g., each question and answer pair), the transcript summary 208, and a grading prompt 406 into the LLM 204. The grading prompt 406 may instruct the LLM 204 to predict whether each question and answer pair can be inferred from the transcript data 118

In response to the input, at (4), the summary evaluation system 108 may determine, using the output of the LLM 204, a grade 408 for each question and answer pair. The grade for each pair may comprise a determination whether the answer can be inferred from the transcript summary 208 (e.g., yes, no, undetermined). In addition, the grade may include an explanation, comment, or citation corresponding to the grade. For example, a "yes" response may comprise a citation from the transcript summary 208 that contains the correct answer. A "no" response may include the correct answer that was unable to be located within the transcript summary 208. Comments such as "no mention of the question/answer in the transcript" or "the summary contains hallucinated information, i.e., information not present in the transcript" may be included in the grade.

At (5), the summary evaluation system 108 may determine a completeness score 314 based on the grades 408. The score may be based on an average number of "yes"

responses, a total number of "yes" responses, or any other metric. In addition, at (7), the score may be transmitted, such as to the device 102 or to another system for further processing.

Figure 5:
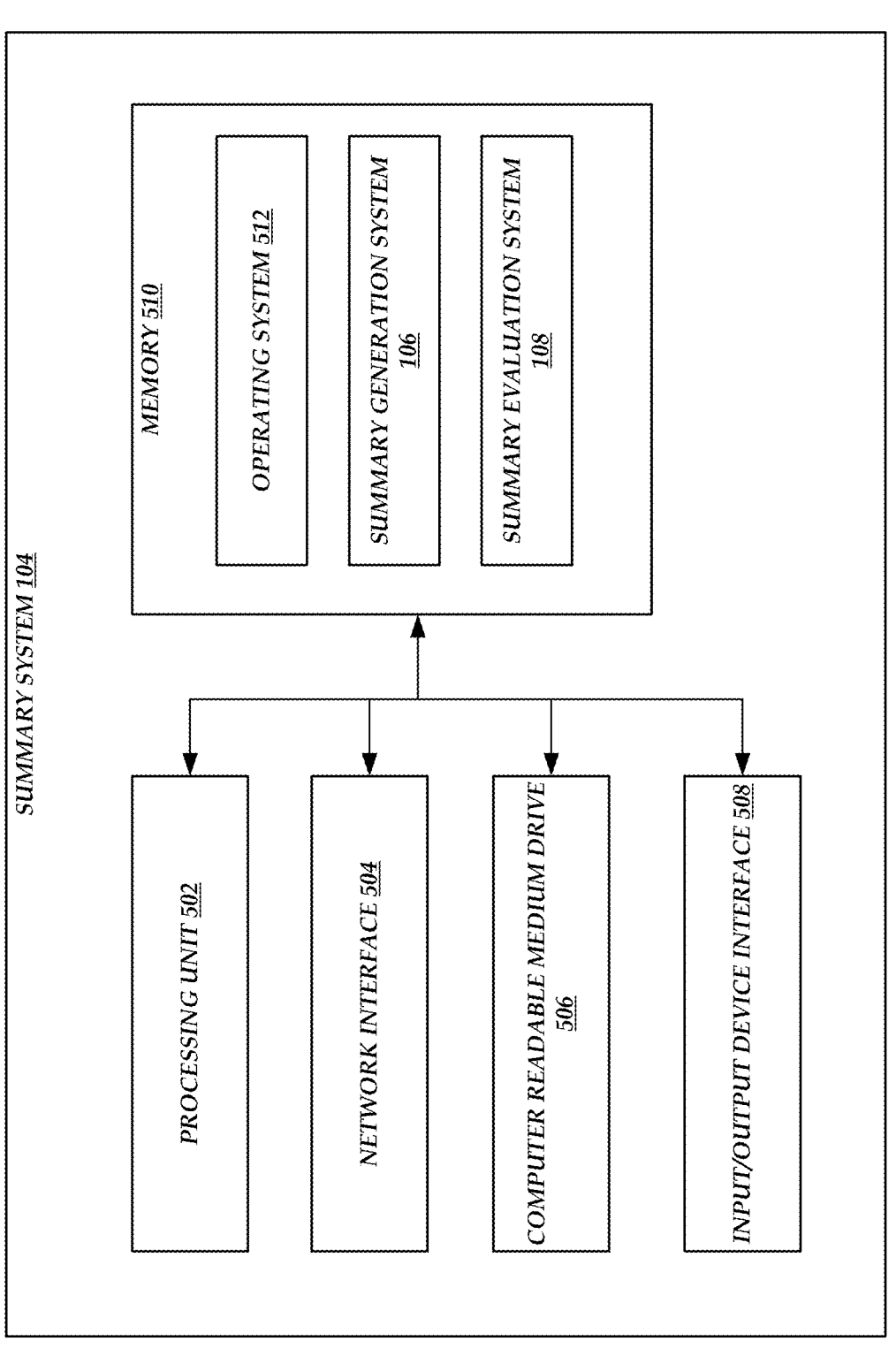
FIG. 5 is a block diagram that illustrates the general architecture of a computing system implementing the summary system 104 of FIG. 1.

FIG. 5 is a block diagram that illustrates the general architecture of a computing system implementing the summary system 104 of FIG. 1. The general architecture of the system depicted in FIG. 5 includes an arrangement of computer hardware and software that may be used to implement aspects of the present disclosure. The hardware may be implemented on physical electronic devices, as discussed in greater detail below. The system may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 1. As illustrated, the system includes a processing unit 502, a network interface 504, a computer-readable medium drive 506, and an input/output device interface 508, all of which may communicate with one another by way of a communication bus.

The network interface 504 may provide connectivity to one or more networks or computing systems. The processing unit 502 may thus receive information and instructions from other computing systems or services via the network. The processing unit 502 may also communicate to and from memory 510 and further provide output information for an optional display (not shown) via the input/output device interface 508. The input/output device interface 508 may also accept input from an optional input device (not shown).

The memory 510 may contain computer program instructions (grouped as units in some embodiments) that the processing unit 502 executes in order to implement one or more aspects of the present disclosure, along with data used to facilitate or support such execution. While shown in FIG. 5 as a single set of memory 510, memory 510 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 510 may store an operating system 512 that provides computer program instructions for use by the processing unit 502 in the general administration and operation of the summary system 104. The memory 510 may further include computer program instructions and other information for implementing aspects of the present disclosure. For example, in one embodiment, the memory 510 includes a summary generation system 106 and a summary evaluation system 108.

The summary generation system 106 may represent code executable to generate a transcript summary 208 from transcript data 118. The summary evaluation system 108 may represent code executable to evaluate a transcript summary 208 based on a generated completeness score and an accuracy score.

The system of FIG. 5 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 5 as a summary system 104, similar components may be utilized in some embodiments to implement other devices shown in the summary system 104 of FIG. 5.

FIG. 6 is an example routine 600 for generating a transcript summary based on a transcript of an active meeting. In some embodiments, the routine 600 is executed by the summary generation system 106 and various components of the summary system 104 and computing environment 100. Specifically, routine 600 may be executed by the processing until 502 of the summary system 104.

At block 602, a transcript chunk 202 of a transcript of an active meeting is received. As noted herein, the transcript chunk 202 may correspond to a portion of the transcript data 118 of an active or ongoing meeting. For example, the transcript chunk 202 may represent a portion of the transcript data 118 generated between a first timestamp to a second timestamp. Alternatively, or in addition, the transcript chunk 202 may represent a portion of the transcript data 118 within a word count, sentence count, character count, etc. In the context of an active meeting, the transcript chunk 202 received by the summary generation system 106 may include a portion of the transcript data 118 generated up until a certain timestamp (e.g., every five minutes, a new transcript chunk 202 is partitioned from an ongoing transcript and received by the summary generation system 106).

At block 604, the transcript chunk 202 is provided as input into a ML model, such as LLM 204. The LLM 204 may include any artificial intelligence, machine learning, deep learning, neural network, etc. that can generate a summary based on the transcript chunk 202. The LLM may be trained on various sets of data. In addition, the LLM 204 may be stored in a remote location, such as in model data store 120, and accessible via network 122 by the summary generation system 106.

In some embodiments, at block 604, in addition to inputting the transcript chunk 202, the summary generation system 106 may make a call to the LLM 204 with a token or a prompt. The prompt may instruct the LLM 204 to generate a summary based on the transcript chunk 202. In some examples, the prompt may provide specific instructions or details to the LLM 204 with respect to the transcript chunk 202. For example, the prompt may instruct the LLM 204 to generate a summary within a certain length (e.g., word count, sentence count, character count), a certain style, a topic, a file size, or any other instruction.

At block 606, a chunk summary 206 corresponding to the transcript chunk 202 is determined, using the ML model. The chunk summary 206 may correspond to a summarization of the transcript chunk 202. The chunk summary 206 may be generated in response to the input transcript chunk 202 and a prompt.

At block 608, the chunk summary 206 is appended to a transcript summary to form a revised transcript summary. The transcript summary may correspond to the active meeting. As noted herein, generation of the chunk summary 206 may occur during an active meeting. In some embodiments, in the case where the chunk summary 206 represents the beginning of a transcript, the chunk summary 206 may become the transcript summary 208. As noted herein, the flow outlined by the block diagram in FIG. 2 is iterative. Accordingly, at block 608, additional chunk summaries 206 may be appended to the transcript summary 208 to form the revised transcript summary.

At block 610, the summary generation system 106 may determine whether a summary threshold has been reached based on the revised transcript summary. The summary threshold may correspond to any quantitative aspect of the transcript summary 208, such as a word count, sentence count, character count, etc. For example, the summary generation system 106 may determine that the revised transcript summary has reached a word count limit of 500 words.

In the case when the summary generation system 106 determines that the summary threshold of the revised transcript summary has been reached, at block 612, the revised transcript summary is provided as input into the ML model.

In some embodiments, in addition to inputting the transcript summary 208 into the LLM 204, the summary generation system 106 may make a call to the LLM 204 with a token or a prompt. The prompt may instruct the LLM 204 to generate a new transcript summary based on the revised transcript summary. In some examples, the prompt may provide specific instructions or details to the LLM 204 with respect to the revised transcript summary. For example, the prompt may instruct the LLM 204 to generate a new transcript summary within a certain length (e.g., word count, sentence count, character count), a certain style, a topic, or any other instruction. Accordingly, the LLM may output a new transcript summary based on the revised transcript summary.

At block 614, a new transcript summary is determined using the ML model. The new transcript summary may correspond to a summarization of the revised transcript summary. The new transcript summary may be generated in response to the revised and a prompt.

At block 616, the revised transcript summary is replaced with the new transcript summary. In some cases, this process allows the transcript summary 208 to stay within a certain word limit as new transcript chunks 202 are received from an active meeting. This process outlined in FIG. 2 may continue until the end of an active meeting and/or all the transcript data 118 has been summarized.

It is noted that the flow outlined by the block diagram in FIG. 2 may be iterative. For example, subsequent transcript chunks 202 may be received by the summary generation system 106 as an active meeting progresses. Subsequent transcript chunk 202 may represent a new portion of the transcript data 118 that has not already been partitioned into a transcript chunk 202. For example, a first transcript chunk 202 may correspond to the first 500 words of the transcript data 118 while a second transcript chunk may correspond to the next 500 words of the transcript data 118. In some embodiments, there may be overlaps of the transcript data 118 between a first transcript chunk and a subsequent transcript chunk.

FIG. 7 is an example routine 700 for evaluating a generated transcript based on completeness and accuracy. In some embodiments, the routine 700 is executed by the summary evaluation system 108 and various components of the summary system 104 and computing environment 100. Specifically, routine 700 may be executed by the processing until 502 of the summary system 104.

At block 702, a first representation of a transcript and a question generation prompt is obtained. In some embodiments, the first representation of the transcript comprises a transcript summary 208. Alternatively, the first representation of the transcript may be the transcript, such as transcript data 118.

At block 704, the first representation of the transcript and the question generation prompt is provided to a first ML model. In addition, a prompt, such as a question generation prompt 302 may be provided to the first ML model.

For example, in some embodiments, the summary evaluation system 108 may input the transcript summary 208 and a question generation prompt 302 into an LLM 204. As noted herein, the transcript summary 208 may be generated by the summary generation system 106 and may correspond to the transcript data 118 of a meeting, call, etc. that was previously active during generation. The question generation prompt 302 may instruct the LLM 204 to generate a set of questions and answers based on the transcript summary 208. The question generation prompt 302 may instruct the LLM 204 to determine a certain number of questions, or instruct to determine question(s) tailored to a specific topic, etc.

In another example, the summary evaluation system 108 may input the transcript data 118 and a question generation prompt 302 into an LLM 204. As noted herein, the transcript data 118 may be used to generate a transcript summary 208 by processes described in FIG. 2 and elsewhere. The transcript data 118 may correspond to a meeting, call, etc. that was previously active during generation of the transcript summary 208. The question generation prompt 302 may instruct the LLM 204 to generate a set of questions and answers based on the transcript data 118. The question generation prompt 302 may instruct the LLM 204 to determine a certain number of questions based on the transcript data 118, or instruct to determine question(s) tailored to a specific topic, etc.

At block 706, questions based on the first representation of the transcript are determined, using the first ML model.

For example, the summary evaluation system 108 may determine, using the output of the LLM 204, a set of questions and corresponding "correct" answers. The set of questions generated by the LLM 204 may be based on the transcript summary 208. The questions generated by the LLM 204 may include any type of question that utilizes information in the transcript summary 208. The questions may include open-ended questions, close-ended questions, topical questions, specific questions, and the like. It is noted that the answers generated may be considered the "correct" answer as related to the transcript summary 208. Additionally, the set of questions and answers derived from the transcript summary 208 may be stored in a question and correct answer bank 304.

In the case when the first representation of the transcript is the transcript data 118 and the second representation of the transcript is the transcript summary 208, the summary evaluation system 108 may determine, using the output of the LLM 204, a set of questions and corresponding "correct" answers. The set of questions generated by the LLM 204 may be based on the transcript summary 208. The questions generated by the LLM 204 may include any type of question that utilizes information in the transcript data 118. The questions may include open-ended questions, close-ended questions, topical questions, specific questions, and the like.

At block 708, the questions and a second representation of the transcript are provided to the first ML model. In addition, the summary evaluation system 108 may input the set of questions (without the corresponding correct answers) and a question answering prompt into the LLM 204. The question answering prompt may instruct the LLM 204 to generate a set of answers ("possible answers") corresponding to each question.

At block 710, answer corresponding to the questions are determined based on the second representation of the transcript. Depending on whether the second representation of the transcript is the transcript or the transcript summary, the summary evaluation system 108 may use either representation to answer the questions.

At block 712, the answers are provided to a second ML model.

At block 714, a score based on the comparison between the answers and correct answers are determined. In some embodiments, the summary evaluation system 108 may input both the set of questions, the set of corresponding correct answers, and the set of possible answers into an embedding model. The embedding model may include any algorithm or AI model, ML model, neural network, etc. trained to encapsulate information into representations in a multi-dimensional space. Here, the embedding model may determine a semantic similarity between the correct answers and the possible answers, such as by using a cosine similarity or other function. The embedding model may determine whether a correct answer and a possible answer is a match, based on the semantic similarity.

In some embodiments, the summary evaluation system 108 may determine whether the score is above or below a score threshold. The score threshold may include a number, value, percentage, and the like. In the case when the score is below the score threshold, the summary evaluation system 108 may prompt the summary generation system 106 to generate a new summary utilizing the correct answers.

The score may include an accuracy score 312 or a completeness score 314. In addition, the score is based on a number of matches between the set of answers and the set of correct answers.

It is also noted that the processes described throughout the specification with reference to any of the FIGS. 1-7 may be performed with respect to an active meeting and/or a meeting that is no longer active. For example, the processes described with respect to the summary generation system 106 may occur after a meeting has concluded. In addition, the processes described with respect to the summary evaluation system 108 may occur after a meeting has concluded.

Some or all of the statistical analysis methods described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system, comprising:
a memory to store specific computer-executable instructions; and
a processor in communication with the memory, wherein the processor is to execute the specific computer-executable instructions to at least:
obtain a first representation of a transcript and a question generation prompt;
provide the first representation of the transcript and the question generation prompt as input into a first machine learning model;
determine, using the first machine learning model, a set of questions and a set of correct answers, based on the first representation of the transcript;
provide the set of questions, a second representation of the transcript, and a question answering prompt as input into the first machine learning model;
determine, using the first machine learning model, a set of possible answers corresponding to the set of questions based on the second representation of the transcript;
provide the set of possible answers and the set of questions to a second machine learning model;
determine, using the second machine learning model, a score based on a comparison between the set of correct answers and the set of possible answers; and
generate, in response to the score being below a score threshold, a third representation of the transcript based on the set of correct answers.

2. The system of claim 1, wherein the transcript comprises a text-based transcript of audio, a conversation, a video conference, an audio conference, a phone call, a video, an audio file, a recording, or a communication of an active meeting.

3. The system of claim 1, wherein the first representation of the transcript comprises a transcript summary and the second representation of the transcript comprises a transcript.

4. The system of claim 1, wherein the first representation of the transcript comprises a transcript and the second representation of the transcript comprises a transcript summary.

5. The system of claim 1, wherein the third representation of the transcript comprises a transcript summary incorporating the set of correct answers.

6. The system of claim 1, wherein the score is one of a completeness score or an accuracy score.

7. The system of claim 1, wherein the comparison includes a sematic similarity between each correct answer of the set of correct answers and each possible answer of the set of possible answers.

8. The system of claim 1, wherein the score is based on a number of matches between the set of possible answers and the set of correct answers.

9. The system of claim 1, wherein the first machine learning model is a large language model and the second machine learning model is an embedding model.

10. A method comprising:
obtaining a transcript summary and a question generation prompt, wherein the transcript summary is based on a transcript;
providing the transcript summary and the question generation prompt as input into a first machine learning model;
determining, using the first machine learning model, a question and a correct answer, based on the transcript summary;

providing the question, the transcript, and a question answering prompt as input into the first machine learning model;

determining, using the first machine learning model, a possible answer to the question based on the transcript;

providing the possible answer and the question to a second machine learning model;

determining, using the second machine learning model, a score based on a comparison between the correct answer and the possible answer; and generating, in response to the score being below a score threshold, a new summary of the transcript based on the correct answer.

11. The method of claim 10, wherein the transcript comprises a text-based transcript of audio, a conversation, a video conference, an audio conference, a phone call, a video, an audio file, a recording, or a communication of an active meeting.

12. The method of claim 10, wherein the score is a completeness score.

13. The method of claim 10, wherein the comparison includes a sematic similarity between the correct answer and the possible answer.

14. The method of claim 10, wherein the first machine learning model is a large language model and the second machine learning model is an embedding model.

15. A non-transitory, computer-readable medium comprising computer-executable instructions for transferring ownership of inventory, wherein the computer-executable instructions, when executed by a computer system, cause the computer system to:

provide a transcript and a question generation prompt as input into a first machine learning model;

determine, using the first machine learning model, a question and a correct answer, based on the transcript;

provide the question, a summary transcript based on the transcript, and a question answering prompt as input into the first machine learning model;

determine, using the first machine learning model, a possible answer corresponding to the questions based on the summary transcript;

determine, using a second machine learning model, a score based on a comparison between the correct answer and the possible answer; and update, in response to the score being above a score threshold, the summary transcript based on the correct answer.

16. The non-transitory, computer-readable medium of claim 15, wherein the transcript comprises a text-based transcript of audio, a conversation, a video conference, an audio conference, a phone call, a video, an audio file, a recording, or a communication of an active meeting.

17. The non-transitory, computer-readable medium of claim 15, wherein the score is an accuracy score.

18. The non-transitory, computer-readable medium of claim 15, wherein the comparison includes a sematic similarity between the correct answer and the possible answer.

19. The non-transitory, computer-readable medium of claim 15, wherein the computer system is further to generate, in response to the score being below a score threshold, a new summary of the transcript based on the correct answer.

\* \* \* \* \*